US010362587B2

(12) United States Patent
Chu et al.

(10) Patent No.: US 10,362,587 B2
(45) Date of Patent: Jul. 23, 2019

(54) METHOD OF DYNAMICALLY ASSIGNING A QUALITY OF SERVICE

(71) Applicant: MOTOROLA SOLUTIONS, INC., Chicago, IL (US)

(72) Inventors: Wei Chu, Sichuan (CN); Dong Zhao, Sichuan (CN); Qingxiao Zheng, Sichuan (CN)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 0 days.

(21) Appl. No.: 15/756,522

(22) PCT Filed: Sep. 24, 2015

(86) PCT No.: PCT/CN2015/090586
§ 371 (c)(1),
(2) Date: Feb. 28, 2018

(87) PCT Pub. No.: WO2017/049543
PCT Pub. Date: Mar. 30, 2017

(65) Prior Publication Data
US 2018/0249474 A1 Aug. 30, 2018

(51) Int. Cl.
*H04W 72/08* (2009.01)
*H04W 4/02* (2018.01)
(Continued)

(52) U.S. Cl.
CPC .......... *H04W 72/085* (2013.01); *G01C 21/20* (2013.01); *G01C 21/206* (2013.01); *H04W 4/02* (2013.01);
(Continued)

(58) Field of Classification Search
CPC . H04W 72/085; H04W 4/029; H04W 72/048; H04W 64/006; H04W 4/02; G01C 21/20; G01C 21/206; H04L 43/08
See application file for complete search history.

(56) References Cited

U.S. PATENT DOCUMENTS 7,072,956 B2  7/2006 Parupudi et al.
8,811,177 B1* 8/2014 Toudeh-Fallah .... H04L 41/5019
                                                       370/235
(Continued)

FOREIGN PATENT DOCUMENTS

CN           101969597           10/2013

OTHER PUBLICATIONS

PCT/CN2015/090586 International Search Report and Written Opinion of the International Searching Authority dated May 10, 2016 (11 pages).

(Continued)

*Primary Examiner* — Jay P Patel
(74) *Attorney, Agent, or Firm* — Michael Best & Friedrich LLP

(57) ABSTRACT

A method of managing communications of a mobile communications device. In one embodiment, the method includes receiving a travel route with the mobile communications device and assigning a first quality of service to the mobile communications device in response to receiving the travel route. The method also includes determining a current location of the mobile communications device, determining a positional deviation of the mobile communications device from the travel route based on the current location of the mobile communications device, and assigning a second quality of service to the mobile communications device when the positional deviation of the mobile communications (Continued)

device exceeds a predetermined threshold. The second quality of service being higher than the first quality of service.

16 Claims, 5 Drawing Sheets

(51) Int. Cl.
  *G01C 21/20* (2006.01)
  *H04W 64/00* (2009.01)
  *H04W 72/04* (2009.01)
  *H04W 4/029* (2018.01)
  *H04L 12/26* (2006.01)

(52) U.S. Cl.
  CPC ......... *H04W 4/029* (2018.02); *H04W 64/006* (2013.01); *H04W 72/048* (2013.01); *H04L 43/08* (2013.01)

(56) References Cited

U.S. PATENT DOCUMENTS

| | | | | |
|---|---|---|---|---|
| 9,516,624 | B2* | 12/2016 | Schmidt | H04W 72/12 |
| 9,888,341 | B2* | 2/2018 | Cho | H04W 4/02 |
| 2005/0075116 | A1 | 4/2005 | Laird et al. | |
| 2006/0265489 | A1 | 11/2006 | Moore | |
| 2009/0054029 | A1 | 2/2009 | Hogberg et al. | |
| 2013/0272251 | A1* | 10/2013 | Schmidt | H04W 72/12 370/329 |
| 2013/0301422 | A1* | 11/2013 | Caretti | H04B 1/1027 370/241 |
| 2014/0369270 | A1* | 12/2014 | Seibert | H04W 16/14 370/329 |
| 2015/0066557 | A1* | 3/2015 | Lichti | H04W 4/029 705/7.15 |
| 2015/0373613 | A1* | 12/2015 | Harris | H04W 36/22 370/331 |
| 2015/0382262 | A1* | 12/2015 | Cho | H04W 4/02 370/331 |
| 2016/0037304 | A1* | 2/2016 | Dunkin | H04L 67/2847 455/456.1 |
| 2016/0158625 | A1* | 6/2016 | DeAngelis | A63B 71/0619 340/539.13 |

OTHER PUBLICATIONS

Hofmann et al., "Dynamic Evacuation Architecture Using Context-Aware Policy Management," International Journal of Computer Science and Applications, ÓTechnomathematics Research Foundation, vol. 6, No. 2, pp. 38-49 (2009).

* cited by examiner

U.S. 10,362,587 B2

METHOD OF DYNAMICALLY ASSIGNING A QUALITY OF SERVICE

BACKGROUND OF THE INVENTION

Public safety first responded (for example, police, firefighters, paramedics, etc.) use a number of different tools and communication devices to facilitate the tasks of decision-making, information exchange, and coordination in emergency and crisis situations. In an emergency situation that requires, for example, a building evacuation, it can be important to communicate a travel route to both first responders and evacuees. The travel route may be, for example, an evacuation route out of a building or a danger zone. In some situations, the travel route guides the first responders to a particular building or area within a building where an emergency is present (e.g., to the source of a fire or to the location of a victim). In some cases, such travel routes are pre-planned and in other cases travel routes are calculated or determined at the site of the emergency.

Determining a travel route at the site of an emergency (and sharing that route with mobile devices carried by first responders and evacuees) may require the exchange of a large amount of data, such as, for example, map and location data. Typically, a broadband connection is required to ensure that the map and location data is provided to the necessary mobile devices in a timely manner. However, public safety networks and mobile communications devices may also be handing other communications. Thus, network congestion and quality of service conflicts may arise. Quality of service is a quantitative measure of network performance and may be based on, among other things, error rates, bit rate, throughput, transmission delay, availability, jitter, or a combinations of these or other parameters. Poor communication conditions may also lead to situations where communication must be repeatedly attempted before they can be successfully completed. Repeatedly attempting to complete communications can drain the batteries of mobile communications devices more rapidly than the drain that occurs during more typical situations.

Accordingly, there is a need for methods and systems of dynamically assigning a quality of service.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
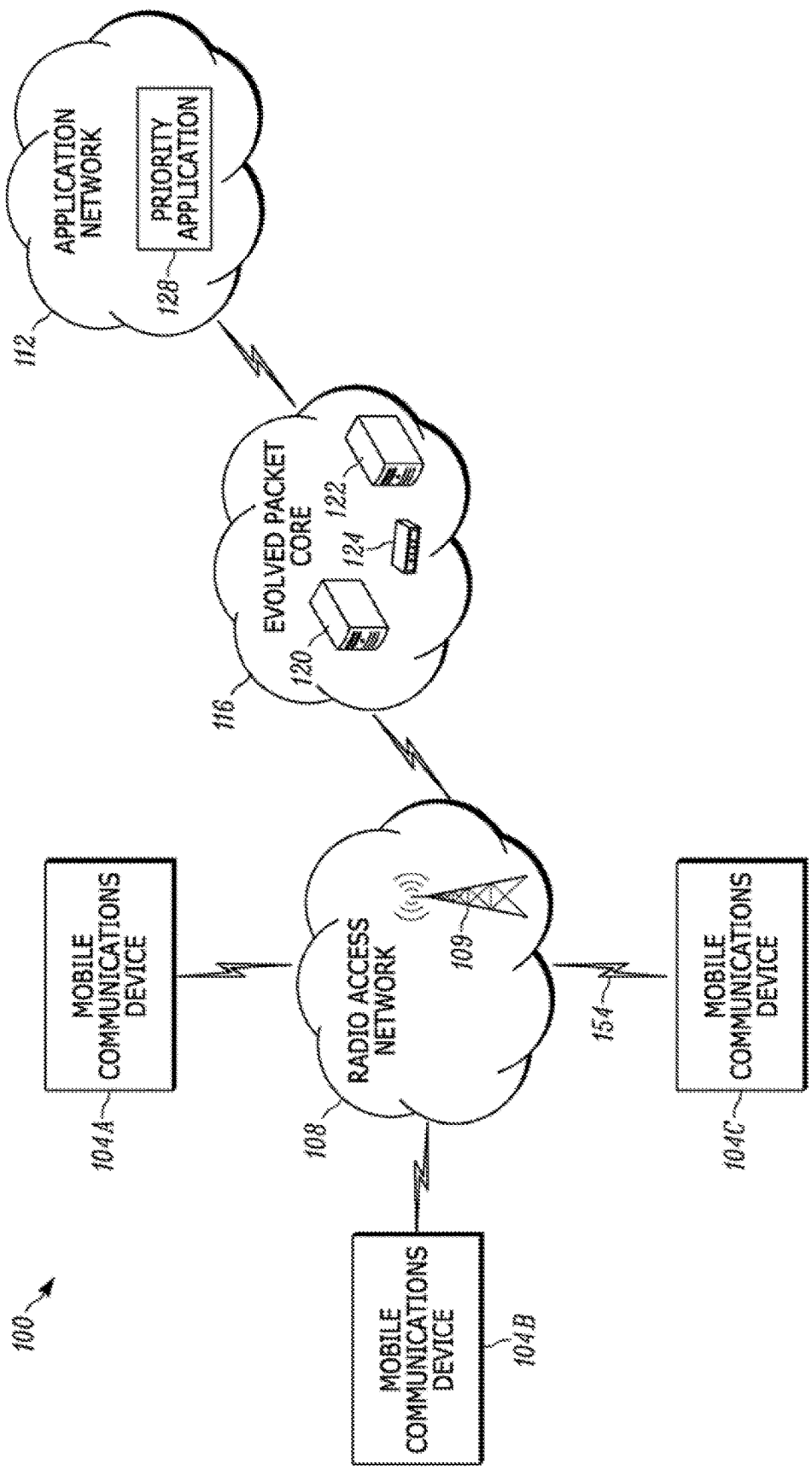
FIG. 1 is a block diagram of an exemplary public safety communication system.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have bees represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

One embodiment provides a method of managing communications of a mobile communications device. The method includes receiving a travel route with the mobile communications device and assigning a first quality of service to the mobile communications device in response to receiving the travel route. The method also includes determining a current location of the mobile communications device, determining a positional deviation of the mobile communications device from the travel route based on the current location of the mobile communications device, and assigning a second quality of service to the mobile communications device when the positional deviation of the mobile communications device exceeds a predetermined threshold. The second quality of service being higher than the first quality of service.

Another embodiment provides a mobile communications device. The mobile communications device includes a location determining circuit, a transceiver, and a processor coupled to the location determining circuit and the transceiver. The processor is configured to receive a travel route via the transceiver, and send a first request signal to a network device requesting to assign a first quality of service to the mobile communications device in response to receiving the travel route. The processor is also configured to determine a location of the mobile communications device, determine a positional deviation of the mobile communications device from the travel route based on the location of the mobile communications device, and send a second request signal to the network device requesting to assign a second quality of service to the mobile communications device when the positional deviation exceeds a predetermined threshold. The second of service being higher than the first quality of service.

FIG. 1 illustrates an exemplary public safety communication system 100. Embodiments of the invention may be implemented in other communication systems, such as for example, military and governmental communications systems. The public safety communication system 100 include a plurality of mobile communications devices 104a through 104c (e.g., land mobile radio devices) connected to a radio access network 108 having a base station antenna 109. In the embodiment shown, the radio access network 108 is linked to an application network 112 through an evolved packet core 116. The mobile communications devices 104a through 104c may be used by public safety agency personnel to perform various tasks and services such as, for example, communicating with one another regarding efforts to reach an emergency site, locating victims, resolving the emergency, providing evacuation services during an emergency, and the like. Because some aspects of the public safety communication system 100 are in constant flux such as, for example, the number of mobile communications devices 104a through 104c connected to the radio access network 108, the distance between each of the mobile communications devices 104a through c and the base station antenna 109, the obstacles between the mobile communications devices 104a through c and the base station antenna 109, as well as other aspects, the quality of service assigned to each packet for the mobile communications devices 104a through c can sometimes differ based on the circumstances of the radio access network 108 and the application network 112. In the illustrated public safety communication system 100, however, the mobile communications devices 104a through 104c communicate with other components of the public safety communication system 100 to ensure that a quality of service assigned to the specific mobile communications device 104a through 104c is adequate given the conditions and needs of the mobile communications device 104 and the rest of the public safety communication system 100. In the illustrated embodiment, each mobile communications device 104a through 104c determines its need for a particular quality of service and communicates with other mobile communications devices 104a through 104c and/or the radio access network 108 to ensure that data packets to and from the mobile communications device 104a through c are assigned the appropriate quality of service.

In other embodiments, a system similar to that shown in FIG. 1 can be established by other organizations that utilize numerous mobile communications devices and that receive a travel route. For example, a governmental agency such as, for example, the military, a central intelligence agency, a federal bureau of investigation, and/or an international agency may also utilize a system such as the one described above with respect to public safety agencies. The travel routes for these different agencies may be to attend to an emergency as described above for the public safety communication system 100, or the travel route can be employed differently by other agencies. For example, the travel route may lead to a strategic meeting point, a supply gathering place, and the like. Similar to the public safety agencies, different governmental agencies may benefit from the method of dynamically monitoring a quality of service as described in further detail below.

As noted above, the evolved packet core 116 interfaces between the radio access network 108 and the application network 112. Although each of these components is shown as a single unit in FIG. 1, in some embodiments the functionality of each may be distributed among multiple different units and/or computers. The evolved packet core 116 includes, or has access to, several servers and gateways that perform different functions to streamline communications between the radio access network 108 and the application network 112 and enhance functionality of the communication system 100. For example, the evolved packet core 116 has access to servers and/or gateways that allow the evolved packet core 116 to keep and synchronize time across the networks (radio access network 108, evolved packet core 116, and application network 112); assign names to different network elements (e.g., assign user friendly names to different mobile communications devices 104a through 104c); store subscriber information; and the like. The evolved packet core 116 may also store authorization keys to grant certain access to specific users. In the particular example illustrated, the evolved packet core 116 also includes a policy controller 120 that interfaces with a priority manager 122 to provide a dynamic quality of service (QoS) to the mobile communications devices 104a through 104c. The policy controller 120 receives session and media information from a priority manager 122 to help determine the network conditions that help determine the appropriate quality of service for each of the mobile communications devices 104a through 104c (e.g., for communications with each of the mobile communications devices).

In the illustrated embodiment, the evolved packet core 116 also has access to (or includes) an evolved packet gateway 124. The evolved packet gateway 124 provides quality of service functionality, in particular the quality of service functionality customized for public safety and/or other agency implementations. The evolved packet gateway 124 prioritizes data traffic on the network to ensure that those mobile communications devices 104a through 104c with the most critical need are assigned the appropriate priority, quality of service, and are allocated the appropriate resources. The policy controller 120 communicates with the evolved packet gateway 124 and provides the evolved packet gateway 124 with information regarding the current use of the network by the mobile communications devices 104a through 104c, the network conditions, and the like.

After determining the appropriate quality of service for the data packets to and from each of the mobile communications devices 104a through 104c and determining other pertinent information for the data communication (e.g., the destination and origin of the communication, the content, etc.), the evolved packet core 116 communicates with the application network 112. The application network 112 may be co-located with the evolved packet core 116 or may be located remotely from the evolved packet core 116. The application network 112 controls access to specific mobile communications devices 104a through 104c based on agency or organizations with which each mobile communications device 104a through 104c is associated. The application network 112 also provides an interface for third parties to communicate with the mobile communications devices 104a through 104c. The application network 112 includes different routers and switches to guide and forward data to different locations. In particular, the application network 112 includes a priority application 128 that manages the flow of data between a particular agency network, an external network (e.g., the radio access network 108), and the evolved packet core 116. The priority application 128 also assigns the appropriate quality of service to each of the mobile communications devices 104a through 104c based on different factors such as, for example, public safety agency with which a device is associated, jurisdiction, user role, incident, application, and the instructions included in the communications from the mobile communications device 104. In the description that follows, we refer to a quality of service being assigned to the mobile communication device 104. Based on the network system, this may mean that each data packet (for example, those data packets transferring information about a travel route) is assigned the quality of service, or that a particular data stream or bearer channel used in communication with the mobile communications device 104 is assigned the quality of service, or that the mobile communication device 104 as a whole is assigned the quality of service. Accordingly, the following description refers generally to assigning a quality of service to the mobile communication device 104 with the understanding that the specific implementation of assigning a quality of service may be slightly different based on the specific network and communication implementation. As discussed above, the priority application 128 considers various factors including an application used by the mobile communications device 104 to determine the appropriate quality of service for the mobile communications device 104. For example, a different quality of service may be assigned based on the application(s) accessed by the mobile communications device 104. For example, if the mobile communications device 104 utilizes an application that requires continuous communication with the application network 112 while operating, the mobile communications device 104 may be assigned a higher quality of service than if the mobile communications device 104 utilizes an application that does not require continuous communication with the application network 112. In a more specific example, the mobile communications device 104 may be assigned a higher quality of service when using a mapping application than when using a camera application to document an accident, for example. The data packets are then appropriately processed with the assigned quality of service. In some embodiments, the priority application 128 receives an indication of the appropriate quality of service for a mobile communications device 104 from the evolved packet core 116 (e.g., the evolved packet gateway 124). The quality of service of a mobile communications device 104 affects the way in which the data packets are processed (e.g., the priority given to the data packets) in each of the networks of the communication system 100. For example, when a high quality of service is assigned to a mobile communications device 104, the data packets to and from the same mobile communications device 104 are given higher priority in the radio access network 108, the evolved packet core 116, and the application network 112. Accordingly, assigning a quality of service to a mobile communications device 104 affects several networks, which in the illustrated embodiments are the radio access network 108, application network 112, and evolved packet core 116.

The application network 112 also provides a travel route to at least one of the mobile communications devices 104a through 104c. The travel route may be used, for example, in evacuation situations or may be used, for example, to reach an emergency site, a medical care facility, or other destination. In the illustrated embodiment, each mobile communications device 104a through 104c determines a condition based on its position (for example, derived via a global positioning system (GPS)) and the generated travel route. Each mobile communications device 104a through 104c then communicates with the radio access network 108 to request a change in the quality of service associated with the mobile communications device 104a through 104c based on the determined conditions.

Figure 2:
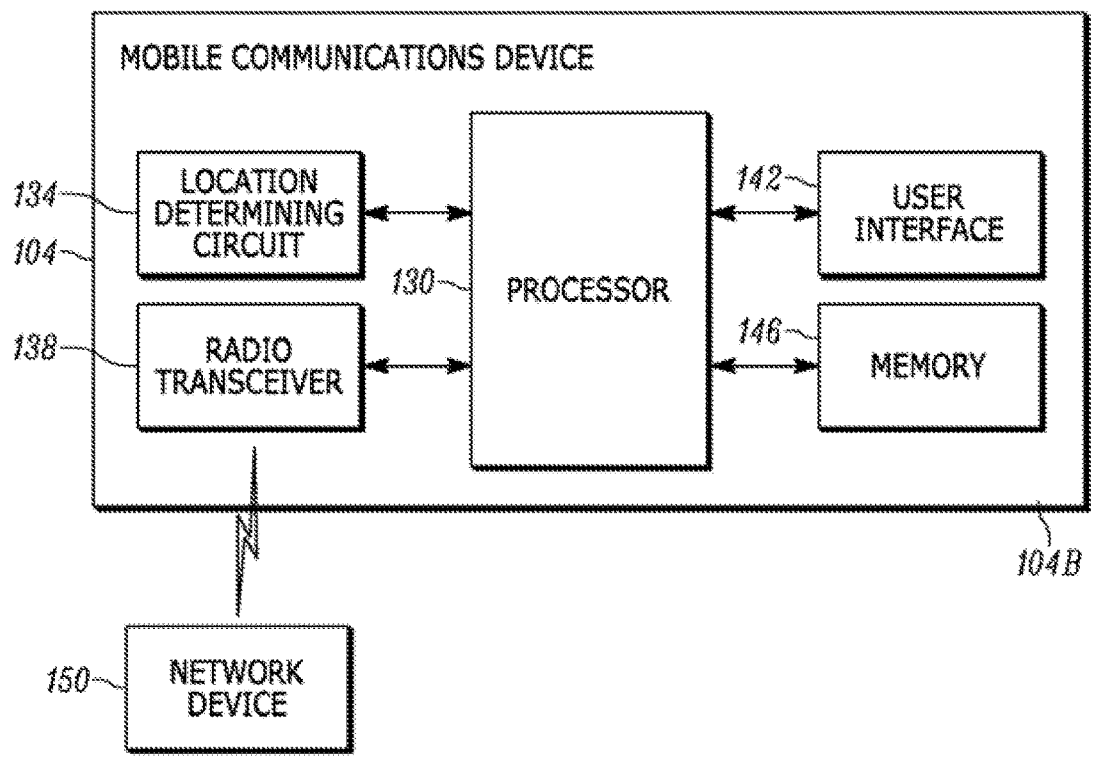
FIG. 2 is a block diagram of a mobile communications device of the public safety communication system of FIG. 1 in accordance with some embodiments.

The mobile communications device 104a through 104c may be, for example, a smart telephone, a tablet computer, a personal digital assistant (PDA), or other device that includes or can be connected to a network modem or components (such as a baseband processor, memory, amplifier, antenna, etc.) to enable wireless network communications. FIG. 2 is a simplified block diagram for the mobile communications device 104a through 104c for illustration purposes. One of skill in the art recognizes that the mobile communications device 104 may include more or less components arranged in the illustrated manner and/or in a different manner. As shown in FIG. 2, in one exemplary embodiment, the mobile communications device 104 includes a processor 130 (such as a microprocessor or other programmable device), a location determining circuit 134 (e.g., a global positioning system circuit, or an indoor location positioning system circuit), a radio transceiver 138, a user interface 142, and a memory 146 (e.g., a non-transitory computer readable medium). The memory 146 includes software stored therein for execution by the processor 130. The memory 146 includes a non-volatile memory for storing a subscription profile (i.e., authentication data and network profile data). The non-volatile memory may be located on a universal integrated circuit card (UICC) in the mobile communications device 104. In some embodiments, the mobile communications device 104 includes a wired communications port (e.g., Ethernet or universal serial bus (USB) connector), via which the processor 130 is also able to communicate with comments that are external to the mobile communications device 104.

Referring to both FIGS. 1 and 2, each mobile communications device 104 is designed to communicate wirelessly with the radio access network 108 through a base station antenna 109 over a wireless communication link 154. The mobile communications device 104 communicates with the base station antenna 109 using the radio transceiver 138.

The user interface 142 of the mobile communications device 104 may vary depending on the type of mobile communications device 104a through 104c. For example, when the mobile communications device 104 is a smart telephone, the user interface 142 may include a touchscreen, physical buttons on the smart telephone, and graphical buttons displayed on the touchscreen, etc. The riser interface 142 may also include a speaker and/or a vibratory element to provide auditory and haptic alert the user of, for example, different conditions or alarm conditions. The location determining circuit 134 includes, for example, a global positioning system circuit or an indoor location positioning system circuit to determine a location of the mobile communications device 104. The mobile communications device 104 provides information to the radio access network 108 regarding the location of the mobile communications device 104. The radio access network 108 forwards the location information for the mobile communications device 104 to the application network 112. When the application network 112 determines a travel route for the mobile communications device 104, the application network 112 uses the location of the mobile communications device 104 to determine the travel route. The application network 112 then communicates with the mobile communications device 104 to deliver the calculated travel route.

Figure 3:
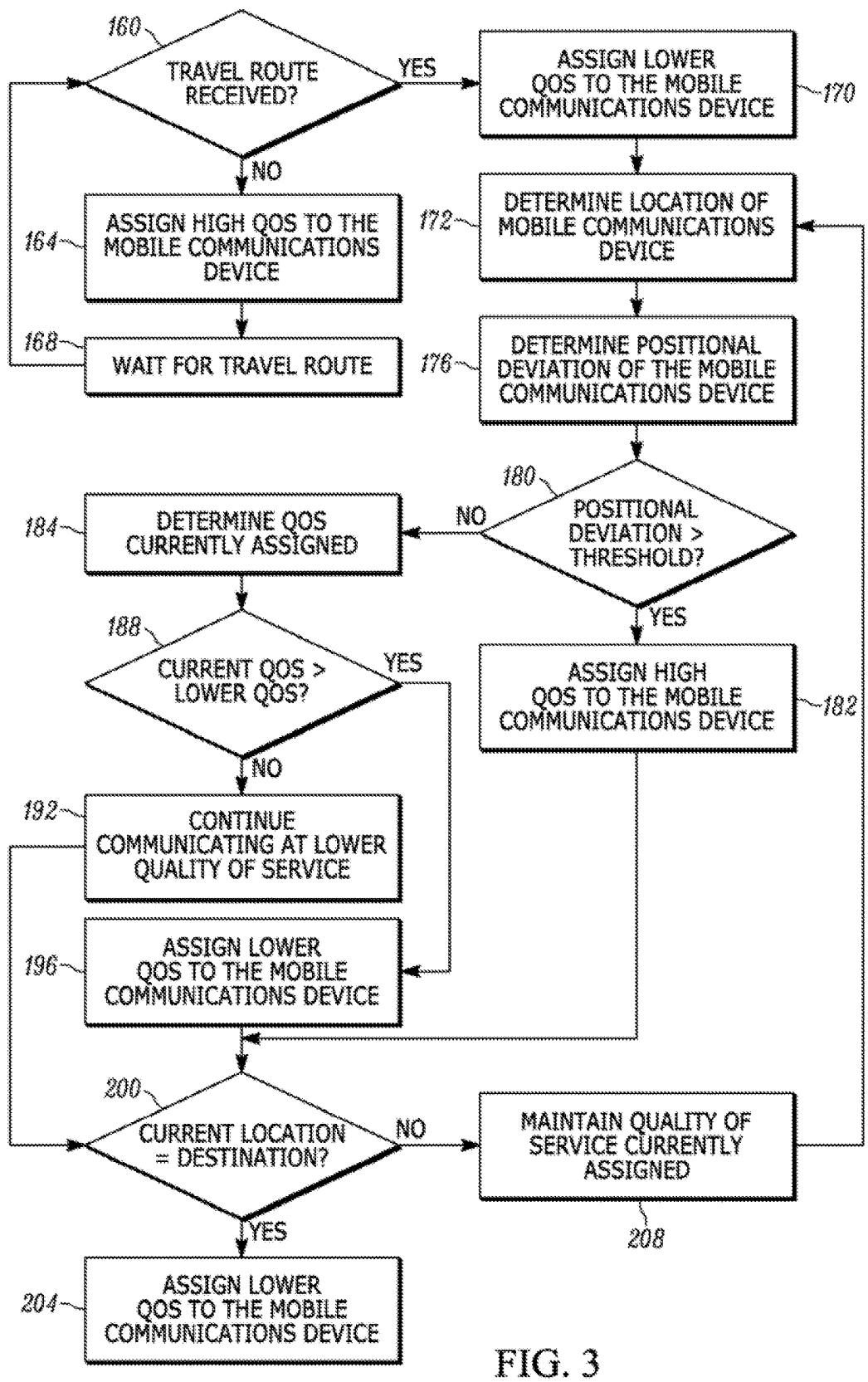
FIG. 3 is a flowchart of a method for dynamically assigning a quality of service in accordance with some embodiments.

FIG. 3 illustrates a method implemented by the processor 130 of the mobile communication device 104 to ensure that an appropriate quality of service is assigned to the mobile communications device 104 (e.g., to the communications of the mobile communications device 104). Referring back to FIG. 2, the mobile communications device 104 communicates with a network device 150 via the radio transceiver 138. In some embodiments, the network device 150 may include the base station antenna 109 (FIG. 1), an intermediary device 220 (FIG. 4), or another device configured to communicate with the radio access network 108.

As shown in FIG. 3, the processor 130 first determines whether a travel route has been received through the radio access network 108 (block 160). When the mobile communications device 104 has not yet received the travel route from the radio access network 108, the mobile communications device 104 sends a request signal to a network device 150 of the radio access network 108 (e.g., the base station antenna 109), to assign a high (or first) quality of service to the mobile communications device 104 (block 164). The mobile communications device 104 then waits, while exchanging communications at the high quality of service, for the calculated travel route from the application network 112 through the radio access network 108 (block 168). When, on the other hand, the mobile communications device 104 has received the travel route, the mobile communications device 104 sends a request signal (e.g., a first request signal) to a network device 150 of the radio access network 108 to assign a low (or second or lower) quality of service to the communications with the mobile communications device 104 (block 170). It should be understood that the terms "high" and "low" and their comparative forms "higher" and "lower" are used to indicate that two different qualities of service are assigned and, in a relative terms, one quality of service is higher than the other. The terms "first" and "second" are used in a similar fashion and used as indicators or comparators to differentiate two qualities of service that are different is some manner.

Assigning a lower quality of service to the mobile communications device 104 after the mobile communications device 104 has received the travel route allows the public safety communication system 100 to reallocate resources to those mobile communications devices 104 that need a higher quality of service (e.g., those mobile communications devices 104 that have not yet received a route) without affecting the perceived quality of service between the other mobile communications devices 104 (e.g., the mobile communications devices 104 that have already received the travel route).

While exchanging communications at the lower quality of service, the processor 130 monitors the location of the mobile communications device 104 to determine if the location of the mobile communications device 104 deviates significantly from the travel route (e.g., when an obstacle is encountered). In some situations, while traveling to the destination users of the mobile communications device 104 encounter unexpected obstacles such as, for example, closed bridges, road or street construction, fallen obstacles, and the like. In such situations, the mobile communications device 104 would benefit from a higher quality of service to ensure that a new travel route is recalculated and delivered to the mobile communications device 104 in a timely manner. Additionally, the higher quality of service would help ensure that the application network 112 receives reliable information regarding the current location of the mobile communications device 104.

Therefore, while exchanging communications at the lower quality of service, the processor 130 determines a location of the mobile communications device 104 (block 172) using, for example, the location determining circuit 134. The mobile communications device 104 then compares the location of the mobile communications device 104 to the travel route and determines (e.g., calculates) a positional deviation of the mobile communications device 104 from the travel route (block 176). The processor 130 then determines whether the positional deviation of the mobile communications device 104 exceeds a predetermined threshold (e.g., a predetermined deviation threshold) at block 180. The predetermined threshold (e.g., the predetermined deviation threshold) differs based on the specific application and the nature of the travel route. For example, when the travel route is calculated to guide an emergency vehicle from a starting location to an emergency location a few miles away, the predetermined threshold may be approximately ninety (90) feet. However, when the travel route is calculated to guide emergency personnel to help victims evacuate a burning building, the predetermined threshold may be significantly lower such as, for example, five (5) feet. In some embodiments, the processor 130 determines the predetermined threshold based on, for example, whether the travel route includes a travel route inside a building, the overall distance of the travel route, and/or a communication from the application network 112 of what the predetermined threshold is.

In such embodiments, the processor 130 may lower the predetermined threshold when, for example, the travel route includes a travel route inside a building. Analogously, the processor 130 may increase the predetermined threshold when, for example, the travel route includes a travel route throughout a city (e.g., outside a building). In other embodiments, the predetermined threshold is static and does not change based on the travel route.

With continued reference to FIG. 3, when the positional deviation exceeds the predetermined threshold, the mobile communications device 104 outputs a signal (e.g., a second request signal) to the network device 150 of the radio access network 108 to assign a high quality of service to the mobile communications device 104 (block 182). In other words, when the positional deviation exceeds the predetermined threshold, the mobile communications device 104 sends a request signal to the network device to increase the quality of service from the low quality of service to the high quality of service. The high quality of service allows the communication system 100 to determine an alternate route faster and more reliably, since information regarding the location of the mobile communications device 104 is communicated to the application network 112 more frequently and the data packets to and from the mobile communications device 104 are assigned a higher priority.

When, on the other hand, the positional deviation of the mobile communications device 104 does not exceed the predetermined threshold (i.e., is less than or equal to), the processor 130 determines the quality of service currently assigned to the mobile communications device 104 (block 184). The processor 130 then compares the quality of service currently assigned to the mobile communications device 104 with the low quality of service (e.g., the low quality of service assigned at block 170) at block 188. When the quality of service currently assigned to the mobile communications device 104 is lower or equal to the lower quality of service, the processor continues to operate and exchange communications at the lower quality of service (block 192). When, however, the quality of service currently assigned to the mobile communications device 104 is higher than the low quality of service, the mobile communications device 104 outputs a signal (e.g., a third request signal) to the network device 150 of the radio access network 108 to assign the lower quality of service to communications with the mobile communications device 104 (block 196). In other words, when the quality of service currently assigned to the mobile communications device 104 is higher than the low quality of service, the mobile communications device 104 sends a request signal to the network device 150 to decrease the quality of service of the mobile communications device 104.

In some embodiments, the quality of service currently assigned to the mobile communications device 104 is not compared to the lower quality of service (e.g., the lower quality of service assigned at block 170). Rather, in some embodiments, the quality of service currently assigned to the mobile communications device 104 is compared to a predefined quality of service threshold. The predefined quality of service threshold may, in some embodiments, be equal to or approximately equal to the lower quality of service. In other embodiments, however, the predefined quality of service threshold may be different than the lower quality of service. Nonetheless, the quality of service currently assigned to the mobile communications device 104 is compared to another quality of service to determine the relative level of the quality of service currently assigned to the mobile communications device 104 and determine whether to decrease the quality of service currently assigned to the mobile communications device 104.

The mobile communications device 104 continues to monitor its location, and, at block 206, determines whether the mobile communications device 104 has reached its destination. When the processor 130 determines that the mobile communications device 104 has reached its destination, the mobile communications device 104 sends a signal to the network device 150 of the radio access network 108 to assign the low quality of service of the mobile communications device 104 (block 204). The signal includes a request to the network device 150 to decrease the quality of service of the mobile communications device 104. When, however, the processor 130 determines that the mobile communications device 104 has not yet reached its destination, the mobile communications device 104 outputs a signal to maintain the quality of service currently assigned to the mobile communications device 104 (block 208) and continues to monitor the location of the mobile communications device 104 with respect to the received travel route (block 172).

Figure 4:
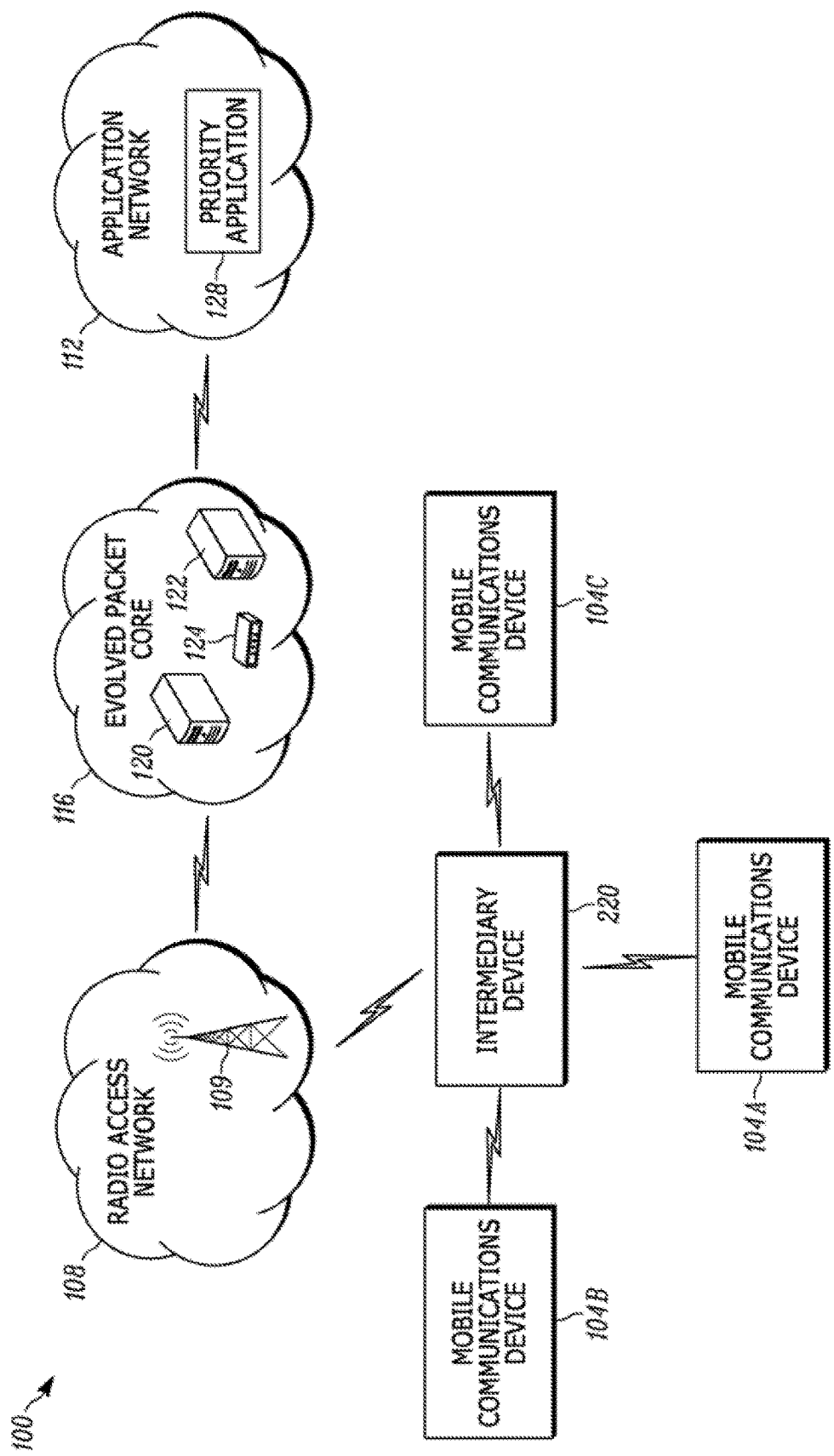
FIG. 4 is a block diagram of a public safety communication system including an intermediary device.

In some embodiments, as shown in FIG. 4, the mobile communications device 104 may not communicate directly with radio access network 108. In some embodiments, an intermediary device 220 handles communications between the mobile communications devices 104*a* through 104*c* and radio access network 108. In such embodiments, the mobile communications device 104 outputs the signals regarding the quality of service (e.g., blocks 164, 170, 182, 196, and 204) to the intermediary device 220. For example, a public safety vehicle may be equipped with a vehicle communication box. The vehicle communication box is configured to enable wireless communication among the mobile communications devices 104*a* through 104*c*. The vehicle communication box then forwards relevant and/or necessary information to the radio access network 108 and the application network 112. The vehicle communication box may include additional sensors to communicate additional information to the radio access network 108 and the application network 112. The vehicle communication box is also connected to the electronic control module of the public safety vehicle and is able to provide information regarding the public safety vehicle to the radio access network 108 and the application network 112. In such embodiments, the mobile communications device 104 executes the process shown in FIG. 3. The mobile communications device 104 outputs the signals assigning a particular quality of service (e.g., blocks 164, 170, 182, 196, and 204) to the vehicle communication box. The vehicle communication box then assigns the specified quality of service to the communications between the vehicle communication box and the mobile communications device 104. The vehicle communication box also transmits a message to the radio access network 108 and the application network 112 such that the appropriate quality of service is associated with the vehicle communication box and, therefore, the mobile communications device 104. As a consequence, when a vehicle communication box or a different intermediary device 220 is used, the mobile communications device 104 is able to change the assigned quality of service both for the communications between the mobile communications device 104 and the intermediary device 220 and between the intermediary device 220 and the radio access network 108.

Figure 5:
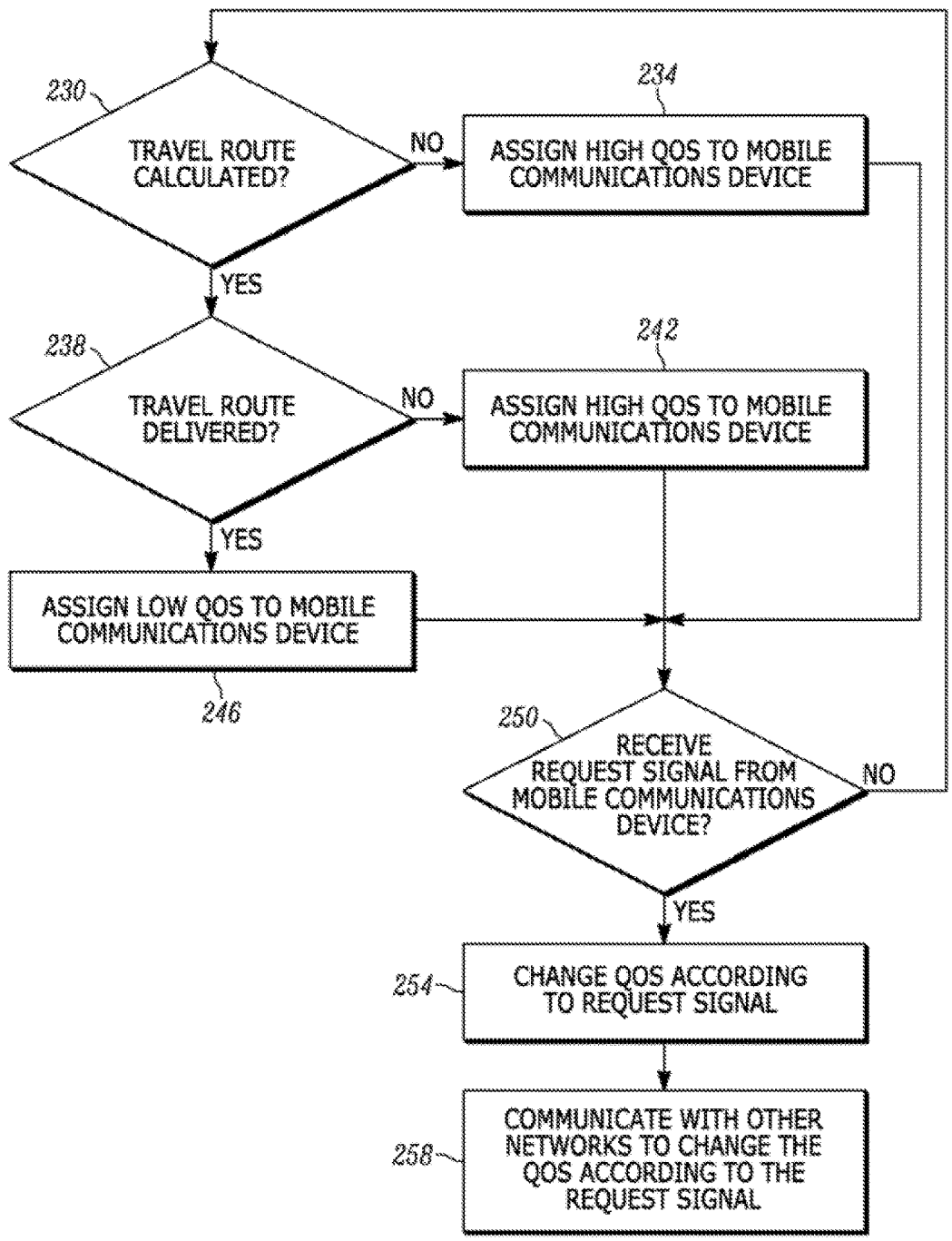
FIG. 5 is a flowchart of a method of dynamically assigning a quality of service in accordance with some embodiments.

FIG. 5 illustrates a method implemented by the network device 150. The network device 150 can be a network device (e.g., a base station having an antenna 109) of the radio access network 108, or the network device can refer to the intermediary device 220. As shown in FIG. 5, the network device 150 first determines whether a travel route for a specific mobile communications device 104 has been calculated (block 230). When the network device 150 determines that the travel route has not been calculated, the network device 150 assigns a high quality of service to the mobile communications device 104 (block 234). Assigning the high quality of service to the mobile communications device 104 includes communicating with other necessary network devices and networks (e.g., network devices in the radio access network 108, the application network 112, and the evolved packet core 116) to ensure that the mobile communications device 104 has a high quality of service across the different networks (radio access network 108, application network 112, and evolved packet core 116) of the public safety communication system 100. When, however, the network device 150 determines that the travel route has been calculated, the network device 150 determines whether the calculated travel route has been delivered to the mobile communications device 104 (block 238).

When the network device 150 determines that the travel route has not yet been delivered to the mobile communications device 104, the network device 150 assigns the high quality of service to the mobile communications device 104 (block 242). On the other hand, when the network device 150 determines that the travel route has already been delivered to the mobile communications device 104, the network device 150 assigns a low quality of service to the mobile communications device 104 (block 246). The network device 150 also monitors the communications received from the mobile communications device 104. Therefore, from blocks 234, 242, and 246, the network device 150 determines whether any communications have been received from the mobile communications device 104 requesting to change the quality of service of the mobile commutations device 104 (block 250). When the network device 150 receives a request signal from the mobile communications device 104 to change the quality of service (e.g., when the positional deviation exceeds the predetermined threshold), the network device 150 changes the quality of service as requested (block 254). The network device 150 then communicates with other network devices and/or other networks (e.g., the application network 112) to indicate the change in quality of service of the mobile communications device 104 (block 258). When, however, the network device 150 does not receive a request signal from the mobile communications device 104, the network device 150 continues to monitor the state of the travel route for the mobile communications device 104 and changing the quality of service accordingly by returning to block 230.

Additionally, although the embodiments described above are described with reference to a low or lower quality of service and a high or higher quality of service, in some embodiments, the public safety communication system 100 is able to switch between several different levels of quality of service. For example, a higher quality of service may refer to three different levels of quality of service that are all higher than another set of levels of quality of service. Analogously, a lower quality of service may refer to three different levels of quality of service that are lower than the set of levels of higher quality of service. Accordingly, when the mobile communications device 104 outputs a signal to assign a particular quality of service, the quality of service may be assigned at one of the pre-specified levels or may switch between one of the lower quality of service levels and one of the higher quality of service levels.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising, " "has", "having, " "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein.

The terms "substantially", "essentially", "approximately", "about" or any other version thereof, are defined as being close to as understood by one of ordinary skill in the art and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory.

Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method of managing communications of a mobile communications device within a network, the method comprising:
    receiving a travel route with the mobile communications device;
    assigning a first quality of service to the mobile communications device in response to receiving the travel route;
    determining a current location of the mobile communications device;
    determining a positional deviation of the mobile communications device from the travel route based on the current location of the mobile communications device; and
    assigning a second quality of service, higher than the first quality of service, to the mobile communications device when the positional deviation of the mobile communications device exceeds a predetermined threshold.

2. The method of claim 1, further comprising:
    when the positional deviation of the mobile communications device is less than or equal to the predetermined threshold, determining a quality of service currently assigned to the mobile communications device;
    when the quality of service currently assigned to the mobile communications device is higher than the first quality of service, assigning the first quality of service to the mobile communications device.

3. The method of claim 2, wherein assigning the first quality of service to the mobile communications device, when the quality of service currently assigned to the mobile communications device is higher than the first quality of service, includes sending a request signal to a network device to decrease the quality of service currently assigned to the mobile communications device.

4. The method of claim 1, wherein assigning the second quality of service to the mobile communications device includes sending a request signal to a network device to increase a quality of service currently assigned to the mobile communications device.

5. The method of claim 1, further comprising
determining whether the mobile communications device reaches a destination defined by the travel route; and
when the mobile communications device has reached the destination, assigning the first quality of service to the mobile communications device.

6. The method of claim 1, further comprising determining whether the travel route includes a route within a building.

7. The method of claim 6, further comprising lowering the predetermined threshold when the travel route includes a route within a building.

8. The method of claim 1, further comprising:
determining whether the travel route has been received by the mobile communications device; and
assigning the second quality of service to the mobile communications device when the mobile communications device has not received the travel route.

9. The method of claim 8, further comprising:
determining whether the travel route has been created;
assigning the second quality of service to the mobile communications device when the travel route has not been created.

10. A mobile communications device comprising:
a location determining circuit;
a transceiver;
a processor coupled to the location determining circuit and the transceiver, the processor configured to
receive a travel route via the transceiver,
send a first request signal to a network device requesting to assign a first quality of service to the mobile communications device in response to receiving the travel route;
determine a location of the mobile communications device,
determine a positional deviation of the mobile communications device from the travel route based on the location of the mobile communications device,
send a second request signal to the network device requesting to assign a second quality of service, higher than the first quality of service, to the mobile communications device when the positional deviation exceeds a predetermined threshold.

11. The mobile communications device of claim 10, wherein the processor is further configured to
determine a quality of service currently assigned to the mobile communications device, when the positional deviation of the mobile communications device is less than or equal to the predetermined threshold,
send a third request signal to the network device requesting to assign the first quality of service to the communications of the mobile communications device when the quality of service currently assigned to the mobile communications device is higher than the first quality of service.

12. The mobile communications device of claim 11, wherein the third request signal to the network device includes a request to decrease the quality of service currently assigned to the mobile communications device.

13. The mobile communications device of claim 11, wherein the processor is configured to continue communicating at the quality of service currently assigned to the mobile communications device when the quality of service currently assigned to the mobile communications device is equal to or lower than the first quality of service.

14. The mobile communications device of claim 10, wherein the processor is further configured to
determine whether the mobile communications device has reached a destination defined by the travel route,
send a third request signal to the network device requesting to assign the first quality of service to the mobile communications device when the mobile communications device has reached the destination.

15. The mobile communications device of claim 10, wherein the predetermined threshold is lower when the travel route includes a route within a building than when the travel route includes a route outside a building.

16. The mobile communications device of claim 10, wherein the processor is further configured to
determine whether the travel route has been received; and
send a third request signal to the network device requesting to assign the second quality of service to the mobile communications device when the processor determines the travel route has not been received by the mobile communications device.

* * * * *